United States Patent [19]

Shinbo

[11] 4,123,326
[45] Oct. 31, 1978

[54] NUCLEAR FUEL ELEMENT AND METHOD FOR FABRICATING THE NUCLEAR FUEL ELEMENT

[75] Inventor: Katsutoshi Shinbo, Katsuta, Japan

[73] Assignee: Hitachi, Ltd., Japan

[21] Appl. No.: 578,766

[22] Filed: May 19, 1975

[30] Foreign Application Priority Data

May 22, 1974 [JP] Japan ................................. 49-56504

[51] Int. Cl.² ............................................... G21C 3/02
[52] U.S. Cl. ................................. 176/68; 176/93 BP
[58] Field of Search ................ 176/68, 73, 74, 79, 176/82, 93 BP

[56] References Cited

U.S. PATENT DOCUMENTS

| | | | |
|---|---|---|---|
| 3,119,747 | 1/1964 | Wallace et al. | 176/68 X |
| 3,198,856 | 8/1965 | Hammond et al. | 176/68 X |
| 3,334,019 | 8/1967 | Bogaardt et al. | 176/68 X |
| 3,342,692 | 9/1967 | Bourrasse et al. | 176/68 X |
| 3,510,398 | 5/1970 | Wood | 176/68 X |
| 3,519,537 | 7/1970 | Ferrari | 176/68 |
| 3,625,821 | 12/1971 | Ricks | 176/68 |
| 3,625,821 | 12/1971 | Ricks | 176/68 |
| 3,702,282 | 11/1972 | Gatley et al. | 176/68 |
| 3,725,635 | 4/1973 | Fink et al. | 176/79 X |
| 3,996,102 | 12/1976 | Thome | 176/78 X |

*Primary Examiner*—Peter A. Nelson
*Attorney, Agent, or Firm*—Craig & Antonelli

[57] ABSTRACT

The opposite ends of a fuel cladding are sealed with end plugs. A plurality of $UO_2$ pellets are charged into the fuel cladding. Defined in the lower portion of the fuel cladding is a gas plenum which houses fission products therein. Charged in the plenum defined in the nuclear fuel element is a material (such as boron carbide which absorbs neutrons and produces helium.

10 Claims, 5 Drawing Figures

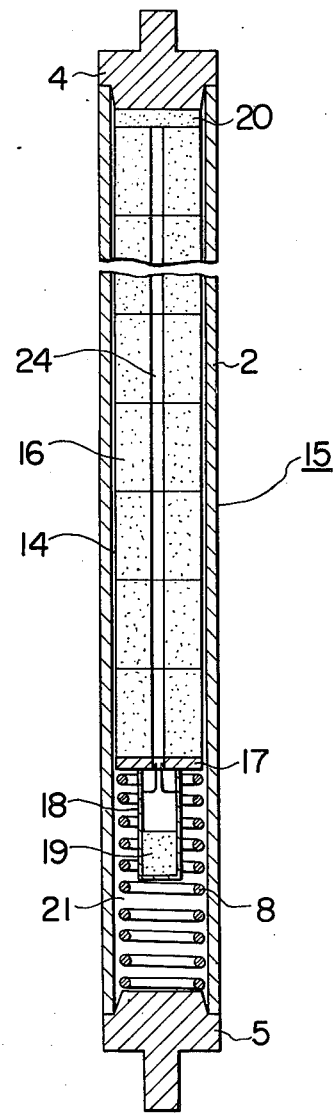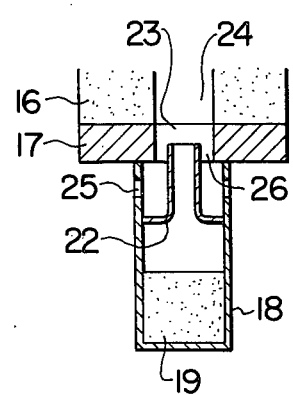
FIG. 4
FIG. 5

NUCLEAR FUEL ELEMENT AND METHOD FOR FABRICATING THE NUCLEAR FUEL ELEMENT

BACKGROUND OF THE INVENTION

This invention relates to a nuclear fuel element and a method for fabricating the nuclear fuel element, and more particularly to a nuclear fuel element and the method for fabricating same, in which is charged a material (such as for instance boron carbide) that causes a $(n, \alpha)$ reaction, i.e., the reaction whereby the aforesaid material absorbs neutrons and then produces helium. (Such a reaction is referred to as $(n, \alpha)$ reaction.)

At the present time, the nuclear element for use in a boiling water reactor has a plurality of $UO_2$ pellets charged in its fuel cladding, both ends of which are sealed with end plugs. The $UO_2$ pellets are produced by molding power of uranium dioxide, sintering same and grinding the uranium dioxide thus sintered. When the $UO_2$ pellets are charged into the fuel cladding, then there will be defined a narrow gap between the $UO_2$ pellets and the fuel cladding. This gap is provided so as to prevent the adverse effects on the fuel cladding due to the deformation of $UO_2$ pellets caused by thermal expansion or swelling. Helium maintained at about 1 Atm. is charged into the fuel cladding beforehand. A fuel assembly is composed of a plurality of nuclear fuel elements, and then the fuel assembly is placed in the core of a reactor pressure vessel. Helium maintained at about 1 Atm. is charged in a gap which is defined between the fuel cladding and the $UO_2$ pellets charged into the initial nuclear fuel element placed in the core of the reactor pressure vessel, while only helium is present in the gap. However, when the boiling water reactor is put into operation and then the operation is continued for a certain period of time, then there are discharged from $UO_2$ pellets various kinds of fission products in the fuel cladding. Included in the fission products are krypton, xenon and the like. Gases (principally, moisture, carbon dioxide gas, nitrogen and the like) which have been absorbed to the surfaces of the $UO_2$ pellets, as well, are discharged into the fuel cladding. The various kinds of gases which have been discharged from the $UO_2$ pellets are accumulated in a gas plenum provided in the upper portion of the fuel cladding and in a gap defined between the $UO_2$ pellets and the fuel cladding. Krypton and xenon are extremely low in their thermal conductivity, as compared with that of helium. (For instance, at 450° C., the thermal conductivity of krypton is about 6.8% of that of helium, and that of xenon is about 4.1% of that of helium.) Krypton and xenon, which have been discharged from $UO_2$ pellets with lapse of the operating time of the boiling water reactor, are accumulated in the fuel cladding gradually, and thus the absolute amount thereof is gradually increased. As a result, the ratio of the gases having extremely low thermal conductivity, such as krypton and xenon, which occupy the gap defined between the $UO_2$ pellets and the fuel cladding, is increased. As the quantities of krypton, xenon and the like are increased, the thermal conductivity between the $UO_2$ pellets and the fuel cladding is lowered. (This thermal conductivity will be referred to as "gap conductance", hereinafter.) It has been confirmed that the $UO_2$ pellets within the nuclear fuel element placed in the core of the boiling water reactor shrink during the operation of the boiling water reactor, i.e., the density of the $UO_2$ pellets is increased to a high level. Upon the occurrence of such phenomenon, the gap defined between the $UO_2$ pellets and the fuel cladding is somewhat increased during the operation of the reactor. Accordingly, the gap conductance is further lowered and hence there results insufficient cooling of $UO_2$ pellets, while the temperature of the overall $UO_2$ pellets is raised. If the temperature of $UO_2$ pellets is too high, because of the failure of piping of the re-circulating system and the resulting loss of coolant, then there will be increased a danger of the failure of the fuel cladding before the emergency cooling device has been operated. Upon the failure of fuel cladding, fission products and nuclear fuel having strong radioactivity and placed in the nuclear fuel element leak into the cooling water, and thus there will be increased a danger of the fission products and nuclear fuel leaking from the failed points in the piping to outside the reactor pressure vessel or the reactor containment.

SUMMARY OF THE INVENTION

It is an object of the present invention to provide a nuclear fuel element and a method for fabricating same, which present less possibility of the failure thereof.

It is another object of the present invention to enhance the cooling of the nuclear fuel being charged in the nuclear fuel element.

The feature of the present invention resides in the material which is charged in the fuel cladding and which causes a $(n, \alpha)$ reaction.

BRIEF DESCRIPTION OF THE DRAWINGS

FIG. 4 is a vertical, cross sectional view of the nuclear fuel element which is another preferred embodiment of the present invention; and FIG. 5 is a detailed, longitudinal cross sectional view of the attaching portion of the water receptacle shown in FIG. 4.

DESCRIPTION OF THE PREFERRED EMBODIMENTS

Figure 1:
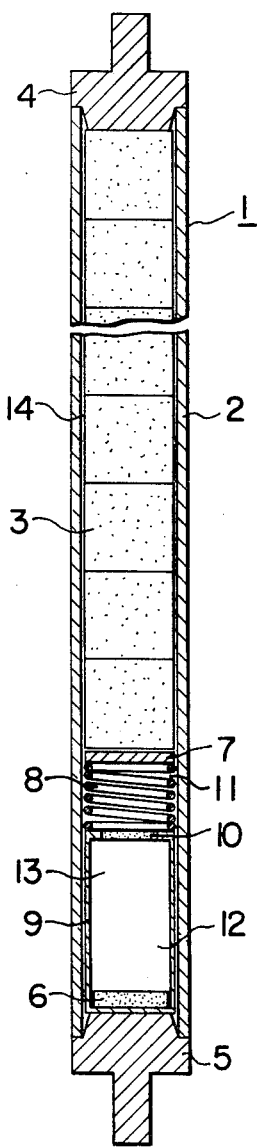
FIG. 1 is a vertical, cross sectional view of the nuclear fuel element embodying the present invention.

Detailed description will be given hereunder of a preferred embodiment of the present invention with reference to FIG. 1. The nuclear fuel element for use in a boiling water reactor consists of a fuel cladding 2, $UO_2$ pellets 3, end plugs 4, 5, boron carbide ($B_4C$) 6 and the like. The opposite ends of the fuel cladding 2 are sealed with end plugs 4 and 5, while a plurality of $UO_2$ pellets 3 are piled one on top of other. The lowermost $UO_2$ pellets 3 are supported by a wafer 7, coil spring 8 and plenum receptacle 9. The wafer 7, coil spring 8 and plenum receptacle 9 are placed within the fuel cladding, while the plenum receptacle 9 is placed on the end plug 5 inwardly. The coil spring 8 and wafer 7 are in turn placed on the plenum receptacle 9. Defined in the top wall of the plenum receptacle 9 is an opening, in which porous material 10 is fitted. A gas plenum 13 is defined by a space between the wafer 7 and the plenum receptacle 9, and by a space 12 within the plenum receptacle 9. The gas is free to move from the space 12 through the porous material 10 into the space 11 or vice versa. A boron sinterd-body 6 (This will be referred to as a boron carbide, hereinafter.) of about 3 g is placed on the bottom of the plenum receptacle 9. A gap 14 is defined between the fuel cladding 2 and UO$_2$ pellets 3 and communicated with the space 11. Helium at about 1 Atm. is filled in the fuel cladding 2.

Figure 2:
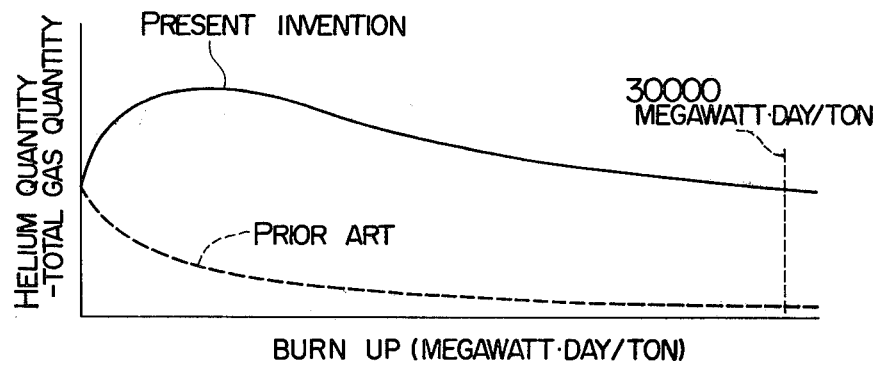
FIG. 2 is a characteristic diagram illustrating the relationship between the burn up and the ratio of helium occupying the space within the nuclear fuel element.
Figure 3:
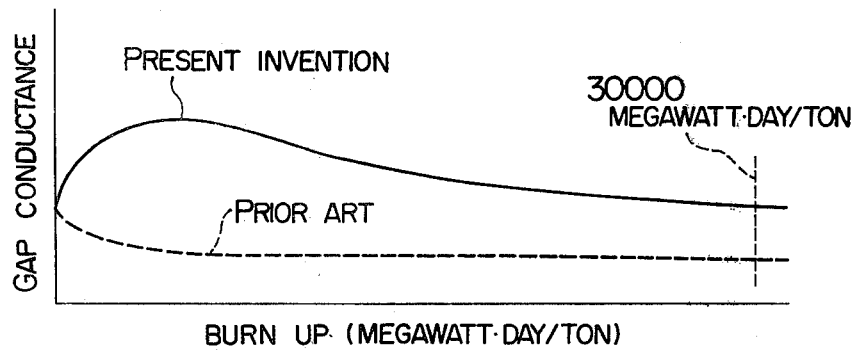
FIG. 3 is a characteristic diagram representing the relationship between the burn up and the gap conductance.

Now, description will be given of the action of the nuclear element 1, when the boiling water reactor is put into operation, while the fuel assembly consisting of nuclear fuel elements 1 is placed in the core of the boiling water reactor. Simultaneously with the commencement of the operation of the reactor, uranium 235 contained in UO$_2$ pellets 3 causes nuclear fission, and as a result the temperature at UO$_2$ pellets 3 is raised. Then, gases adsorbed to UO$_2$ as well as krypton and xenon produced according to the nuclear fission of uranium 235 are discharged into the gap 14. This lowers the gap conductance, as has been described earlier. However, the boron carbide 6 present within the plenum receptacle 9 may prevent lowering of the gap conductance. In other words, the boron carbide 6 absorbs neutrons, thereby producing helium gradually. Helium thus produced is discharged into the space 12 in the plenum receptacle 9. Any material other than boron carbide may be used, as far as it causes a $(n, \alpha)$ reaction to produce helium by absorbing neutrons. Included by materials which cause a $(n, \alpha)$ reaction are boron 10 and its compounds. Since the helium which has been discharged from the boron carbide 6 into the space 12 is small in mass number and light in weight, helium passes through the porous material 10 and space 11, and into the gap 14. Helium is diffused from below to upwards within the gap 14. On the other hand, krypton and xenon which have been discharged from UO$_2$ pellets into the gap 14 are extremely large in mass number and heavy in weight, so that they go downwards through the gap 14 into the gas plenum 13. Since even during the operation of the reactor, fresh helium is supplied into the gap 14, the gap conductance will not be lowered to the level which would otherwise be reached hitherto. This tendency will be described in more detail by referring to FIGS. 2 and 3, hereunder. A plot of the ratio of the quantity of helium to the total gas quantity, and as a function of the burn up of the nuclear fuel is shown in FIG. 2. The relationship therebetween according to the prior art is represented by a broken line, while the relationship therebetween according to the present invention is shown by a solid line. As best shown, the ratio of the quantity of helium to the total gas quantity is extremely increased according to the present invention, as compared with that for the prior art, over the entire range of the nuclear fuel element burn up (over the entire period of the use of nuclear fuel element). The life of the nuclear fuel element is about 25,000 to 30,000 megawatt.day/ton in terms of burn up. The quantity of helium according to the present invention is increased about 10 times as much as that of the prior art, when comparing at the burn up of about 30,000 megawatt.day/ton. Since helium produced from boron carbide 6 is diffused into the gap 14, the ratio of the quantity of helium to the total gas quantity is increased as compared with the case of the prior art. The thermal conductivity of helium is excellent as compared with those of krypton and xenon, so that the gap conductance may be improved to a further extent, with the increase in the quantity of helium. This is best shown in FIG. 3. FIG. 3 represents the relationship between the burn up and the gap conductance. In comparison in terms of the combustion rate of 30,000 megawatt.day/ton, the present invention presents the gap conductance twice as much as that of the prior art. The increase in the gap conductance leads to efficient conductance of heat to the fuel cladding. In other words, there results improved cooling effect of UO$_2$ pellets 3 by means of coolant which flows around the nuclear fuel elements.

More specifically, the temperature difference between the surfaces of UO$_2$ pellets 3 and the fuel cladding is lowered by about 180° C., as compared with that in the prior art. This then causes the lowering of the temperature in the center of UO$_2$ pellets 3 by about 200° C., so that the heat accumulated in the nuclear fuel elements is decreased. Even in the event of loss of coolant, the temperature rise in the nuclear fuel elements is suppressed in contrast to the case of the prior art, a danger of failure may be eliminated. This greatly contributes to the safety of a reactor.

In the aforesaid embodiment, boron carbide is charged in the gas plenum provided in the lower portion of the nuclear fuel element. However, boron carbide may be placed anywhere within the nuclear fuel element. In case the gas plenum is located in the upper portion of the nuclear fuel element, boron carbide may be charged in this gas plenum. Boron carbide may be charged among UO$_2$ pellets 3. In such a case, the axial power distribution of the nuclear fuel elements may be rendered uniform by adjusting the amount of boron carbide to be charged. However, care should be taken so as not to place boron carbide in the core of the reactor on the same level in concentric fashion. Although boron carbide may be charged in various places within the nuclear fuel element, it is recommended that boron carbide be placed in the lower portion of the nuclear fuel element. This is well supported by the fact that the mass number of helium is small, while those of krypton and xenon are large. Helium is likely to be diffused throughout the gap 14, because the lighter gas ascends through the gap 14, and the heavier gas descends.

By adding to boron carbide a small amount of materials of the rare earth elements which are burnable poisons, such as compounds of dysprosium, gadolinium, europium, and the like, the quantity of helium being produced during the operation of the reactor may be adjusted. By adjusting the amount of boron carbide to be charged into the nuclear fuel element, the quantity of helium to be charged into the fuel cladding may be simply adjusted.

In the aforesaid embodiment, the fuel cladding and end plugs are secured in position by the use of tungsten inert gas welding. However, there arises a high level of possibility of local hydriding being caused in the welds between the fuel cladding and the end plugs, if resorted to the aforesaid welding technique. At the present time, there comes to the fore an attempt to joined the fuel cladding and end plugs according to the electron beam welding. However, in this case, the material to be welded should be placed in a vacuum atmosphere. Since helium should be filled in the fuel cladding, there arise many problems in the application of the electron beam welding. As in the aforesaid embodiment, if boron carbide is charged in the fuel cladding, the electron beam welding may readily be practiced.

One end plug 5 is secured to one end of the fuel cladding 2 acccording to the electron beam welding in a vacuum atmosphere. Placed in the fuel cladding 2 are the plenum receptacle 9 having boron carbide therein, coil spring 8, wafer 7 and UO$_2$ pellets 3. Those are placed in the vacuum atmosphere, and then another end plug 4 is secured to the other open end of the fuel cladding 2 according to the electron beam welding. At this time, the interior of the fuel cladding, with opposite ends sealingly closed, is maintained in vacuum. The nuclear fuel elements thus prepared are assembled into a fuel assembly, which in turn is placed in the core of the reactor. When the operation of the reactor is commenced, helium which is being produced from boron carbide starts filling into the nuclear fuel element 1. The early part of the period after the starting of operation of the reactor, the pressure of helium in the fuel cladding reaches 1 atmospheric pressure. Since the aforesaid period is quite short, there is no possibility of the nuclear fuel element being crushed due to the pressure prevailing in the reactor. On the other hand, helium may be produced by radiating neutrons against the boron carbide within the nuclear fuel element, before the nuclear fuel element is placed in the reactor. However, it is required in this case that there be taken an action not to cause the nuclear fission of a nuclear fuel, for instance, an action to cover $UO_2$ pellets in the nuclear fuel element with a neutron absorbing material. In this embodiment, it is not required that helium be charged in the nuclear fuel element beforehand. Thus, complicated equipment and procedures required for filling helium in the nuclear fuel element may be avoided. Even in case the fuel cladding and end plugs are welded according to the tungsten inert gas welding, difficulties arising from the filling operation of helium may be avoided.

Another embodiment according to the present invention will now be described with reference to FIGS. 4 and 5, hereunder. Similar parts are designated the same reference numerals, in common with those shown in the embodiment of FIG. 1. Hollow $UO_2$ pellets 16 are charged in the fuel cladding, with the opposite ends thereof being sealingly closed, and maintained in place by means of wafer 17, and coil spring 8. Boron carbide 20, which is a sintered material, is placed between the uppermost $UO_2$ pellet 16 and the end plug 4. On the other hand, a receptacle 18 is placed in a gas plenum 21 present in the lower portion of the fuel cladding 2, i.e., under the wafer 17. Boron carbide 19 is present in the receptacle 18. Boron carbides 19 and 20 weigh about 1.5 g. FIG. 5 shows a detailed view of the attaching portion of the wafer 17 to the receptacle 18. A nozzle 22 is provided in the upper portion of the receptacle 18, with the tip of nozzle 22 being fitted into an opening 23 in the wafer 17. The opening 23 is communicated with a center hollow portion 24 defined in the center portion of the $UO_2$ pellets 16. An opening 25 is defined in the receptacle 18 between the attaching portion of the nozzle 22 and the wafer 17. Helium at 1 Atm. is filled in the fuel cladding beforehand.

The nuclear fuel elements 15 thus prepared are assembled into a fuel assembly, which is then placed in the core of the reactor, and then the reactor is put into operation. Boron carbides 19 and 20 absorb neutrons and then produce helium. The temperature at the center portion of the $UO_2$ pellets 16 is about 2,000° C. The temperature at the surfaces of $UO_2$ pellets in the vicinity of the fuel cladding 2 ranges from 500° to 600° C. Such a difference in temperature causes the gas to ascend through the center hollow portion 24, while the gas within the gap 14 descends. In other words, there is developed a circulating flow which flows in turn by way of center hollow portion 24, gap 14, opening 25, gap 26 defined between the nozzle 22 and the wall of opening 23, and back to the center hollow portion 24. Helium produced from boron carbide 19 within the receptacle 18 is discharged through the nozzle 22 into the center hollow portion 24 and ascends through the center hollow portion 24, being carried by the aforesaid circulating flow. Krypton and xenon being discharged from $UO_2$ pellets 16 are gradually accumulated in the gas plenum 21, during circulation. In this embodiment, the diffusion of helium into the gap 14 is accelerated. The ratio of the quantity of helium to the total gas quantity is increased, and the gap conductance is improved.

According to the present invention, the gap-conductance as well may be increased, while the temperature rise of the entire nuclear fuel element may be prevented. This eliminates the danger of the failure of nuclear fuel element, and hence improved safety of the reactor itself results.

The present invention may be applied to nuclear fuel elements for use in the nuclear reactors other than boiling water reactor, such as for instance, pressurized water reactor, heavy water reactor, fast breeder reactor and the like.

What is claimed is:

1. A nuclear fuel element comprising: a sealed fuel cladding; nuclear fuel pellets contained within said sealed fuel cladding, said pellets having a size smaller than an internal dimension of said sealed fuel cladding to form a gap between said pellets and said sealed fuel cladding, and said pellets having an axial through hole disposed therethrough; a gas plenum contained within said sealed fuel cladding; gas circulation means including said gap and said axial through hole for causing circulation of helium gas around said nuclear fuel pellets within said sealed fuel cladding; means for causing $(n, \alpha)$ reaction disposed in said gas plenum; and a receptacle arranged in said gas plenum for containing said means for causing $(n, \alpha)$ reaction, wherein said receptacle includes a nozzle for discharging gas produced by said $(n, \alpha)$ reaction, said discharge nozzle being inserted into said axial through hole to define an annular passage between said discharge nozzle and said axial through hole, said gas circulation means being further constituted by said annular passage.

2. A nuclear fuel element according to claim 1, wherein said means for causing $(n, \alpha)$ reaction disposed in said gas plenum includes a material capable of causing said $(n, \alpha)$ reaction.

3. A nuclear fuel element according to claim 2, wherein said material is at least one of boron and compounds of boron.

4. A nuclear fuel element according to claim 1, wherein said means for causing $(n, \alpha)$ reaction disposed in said gas plenum is positioned apart from said nuclear fuel pellets.

5. A nuclear fuel element comprising: an elongated sealed fuel cladding member; nuclear fuel pellets contained within said sealed fuel cladding member, said pellets having a size smaller than an internal dimension of said sealed fuel cladding member to form a gap between said pellets and said sealed fuel cladding member, and said pellets having an axial through hole disposed therethrough; a gas plenum contained within said sealed fuel cladding member, said gas plenum being arranged at a lower end of said elongated member; gas circulation means communicating with said gas plenum and including said gap and said axial through hole for causing circulation of helium gas around said nuclear fuel pellets within said sealed fuel cladding member; and means for causing (n, α) reaction dispoed in said gas plenum.

6. A nuclear fuel element according to claim 5, wherein said means for causing (n, α) reaction disposed in said gas plenum is positioned apart from said nuclear fuel pellets.

7. A nuclear fuel element according to claim 6, wherein said means for causing (n, α) reaction disposed in said gas plenum includes a material capable of causing said (n, α) reaction.

8. A nuclear fuel element according to claim 7, wherein said material is at least one of boron and compounds of boron.

9. A nuclear fuel element according to claim 8, wherein said nuclear fuel pellets are of a nuclear material being at least one of uranium and compounds of uranium.

10. A nuclear fuel element according to claim 8, wherein said material is added to another material which is a burnable poison.

* * * * *